(12) United States Patent
Slater et al.

(10) Patent No.: US 10,402,955 B2
(45) Date of Patent: Sep. 3, 2019

(54) LONG EXPOSURE FILTER

(71) Applicant: Facebook, Inc., Menlo Park, CA (US)

(72) Inventors: Michael Slater, Nottingham (GB); Stef Marc Smet, London (GB)

(73) Assignee: Facebook, Inc., Menlo Park, CA (US)

( * ) Notice: Subject to any disclaimer, the term of this patent is extended or adjusted under 35 U.S.C. 154(b) by 0 days.

(21) Appl. No.: 15/387,472

(22) Filed: Dec. 21, 2016

(65) Prior Publication Data

US 2018/0174343 A1 Jun. 21, 2018

(51) Int. Cl.
*G06T 5/50* (2006.01)
(52) U.S. Cl.
CPC ...... *G06T 5/50* (2013.01); *G06T 2207/10016* (2013.01); *G06T 2207/10024* (2013.01); *G06T 2207/20221* (2013.01)
(58) Field of Classification Search
None
See application file for complete search history.

(56) References Cited

U.S. PATENT DOCUMENTS

| 6,100,937 A | * | 8/2000 | DiMeo | G06T 5/50 348/560 |
| 2013/0169755 A1 | * | 7/2013 | Choo | H04N 13/0497 348/46 |
| 2013/0329073 A1 | * | 12/2013 | Majewicz | H04N 1/387 348/222.1 |
| 2014/0164927 A1 | * | 6/2014 | Salaverry | H04N 1/2112 715/727 |
| 2015/0071613 A1 | * | 3/2015 | Dharssi | G06T 11/60 386/278 |
| 2016/0005154 A1 | * | 1/2016 | Meyers | G06T 5/007 382/274 |

* cited by examiner

*Primary Examiner* — Xiao M Wu
*Assistant Examiner* — Steven Z Elbinger
(74) *Attorney, Agent, or Firm* — Baker Botts L.L.P.

(57) ABSTRACT

In one embodiment, a method includes a computer machine reviewing a picture image and an associated video with the associated video including several video frames. The computer machine then statistically analyzes the corresponding areas for each video frame. The computer machine then compares an area in the picture image with an associated area in a video frame image, wherein the video frame image is based in part on the statistical analysis of the corresponding area for each video frame. Next, the computer machine creates an area for a composite image based in part on the comparison of the area in the picture image with the associated area in the video frame image.

13 Claims, 7 Drawing Sheets

LONG EXPOSURE FILTER

TECHNICAL FIELD

This disclosure generally relates to editing a picture image.

BACKGROUND

A mobile computing device—such as a smartphone, tablet computer, or laptop computer—may include functionality for determining its location, direction, or orientation, such as a GPS receiver, compass, gyroscope, or accelerometer. Such a device may also include functionality for wireless communication, such as BLUETOOTH communication, near-field communication (NFC), or infrared (IR) communication or communication with a wireless local area networks (WLANs) or cellular-telephone network. Such a device may also include one or more cameras, scanners, touchscreens, microphones, or speakers. The mobile computing device may capture an image and an associated video by using, for example, a camera. Mobile computing devices may also execute software applications, such as games, web browsers, or social-networking applications. With social-networking applications, users may connect, communicate, and share information with other users in their social networks.

SUMMARY OF PARTICULAR EMBODIMENTS

Particular embodiments provide techniques to perform statistical analysis on a picture image and an associated video in order to create a clear image with photographic effects, such as blurring and motion capture. In an embodiment, a computer machine reviews a picture image and an associated video, wherein the associated video comprises a plurality of video frames. The computer machine statistically analyzes corresponding areas for each video frame to create a video frame image based in part on the statistical analysis of the corresponding areas for each video frame. The computer machine compares an area in the picture image with an associated area in a video frame image and creates an area for a composite image based in part on the comparison of the area in the picture image with the associated area in the video frame image.

The embodiments disclosed herein are only examples, and the scope of this disclosure is not limited to them. Particular embodiments may include all, some, or none of the components, elements, features, functions, operations, or steps of the embodiments disclosed above. Embodiments according to the invention are in particular disclosed in the attached claims directed to a method, a storage medium, a system and a computer program product, wherein any feature mentioned in one claim category, e.g. method, can be claimed in another claim category, e.g. system, as well. The dependencies or references back in the attached claims are chosen for formal reasons only. However any subject matter resulting from a deliberate reference back to any previous claims (in particular multiple dependencies) can be claimed as well, so that any combination of claims and the features thereof are disclosed and can be claimed regardless of the dependencies chosen in the attached claims. The subject-matter which can be claimed comprises not only the combinations of features as set out in the attached claims but also any other combination of features in the claims, wherein each feature mentioned in the claims can be combined with any other feature or combination of other features in the claims. Furthermore, any of the embodiments and features described or depicted herein can be claimed in a separate claim and/or in any combination with any embodiment or feature described or depicted herein or with any of the features of the attached claims.

DESCRIPTION OF EXAMPLE EMBODIMENTS

Figure 1:
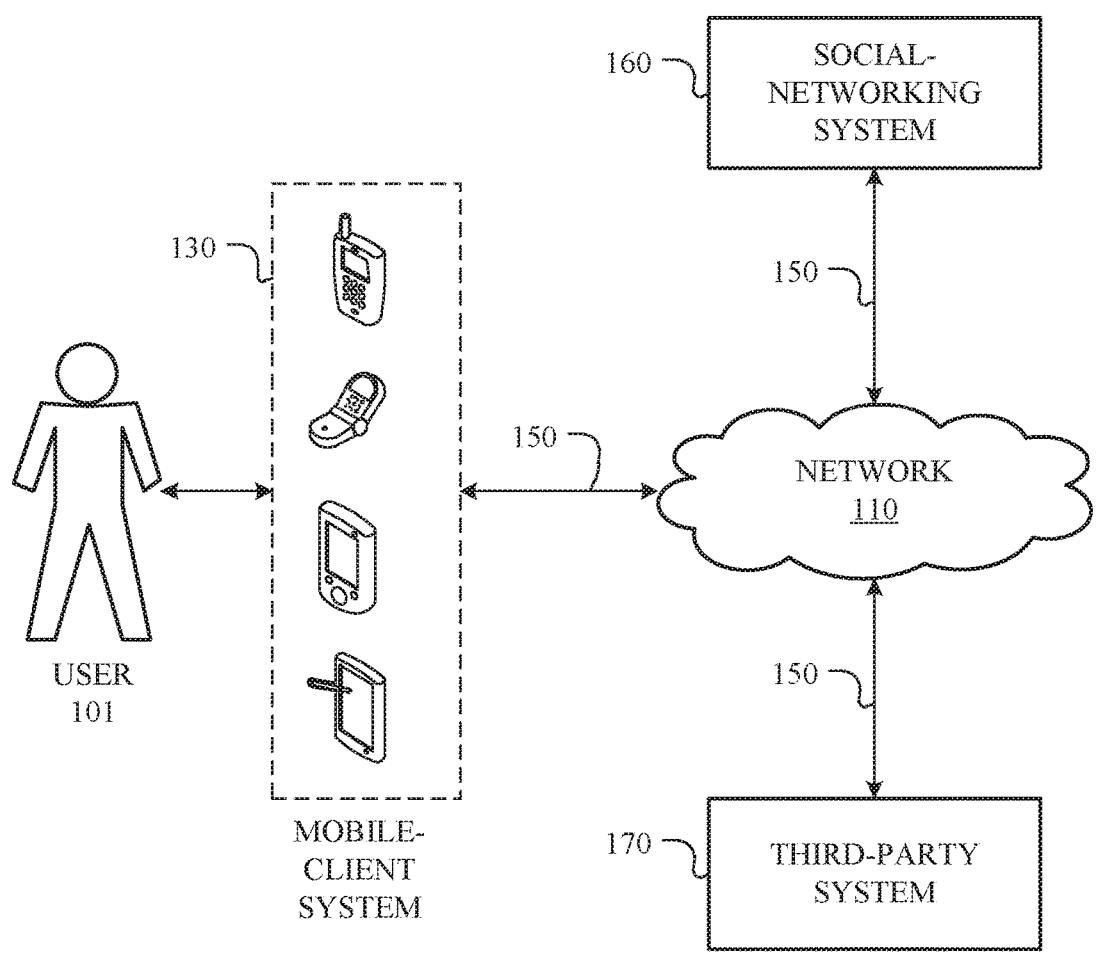
FIG. 1 illustrates an example network environment associated with a social-networking system.

A mobile computing device may capture an image and an associated video by using, for example, a camera. Mobile computing devices may also execute software applications, such as games, web browsers, or social-networking applications. With social-networking applications, users may connect, communicate, and share information with other users in their social networks.

This approach may be inefficient. For example, a mobile computing device may utilize both the image and the associated video to create a clear image with photographic effects such as blurring and motion capture. Accordingly, particular embodiments provide techniques to perform statistical analysis on a picture image and an associated video in order to create a clear image with photographic effects, such as blurring and motion capture. In an embodiment, a computer machine reviews a picture image and an associated video, wherein the associated video comprises a plurality of video frames. The computer machine statistically analyzes corresponding areas for each video frame and creates a video frame image based in part on the statistical analysis of the corresponding areas for each video frame. The computer machine compares an area in the picture image with an associated area in a video frame image and creates an area for a composite image based in part on the comparison of the area in the picture image with the associated area in the video frame image.

In an exemplary embodiment, a camera may take a series of pictures during a picture capture. The camera may be an independent camera or may be a part of a client system and/or a computer machine. Moreover, rather than freezing a moment in time with a single picture, a camera may capture moments before and/or after a picture is taken. For example, a camera may capture 1.5 seconds of video before and after a user presses a shutter button to take a photo. In certain embodiments, the camera or camera application may record video when activated. Accordingly, when a user presses the shutter button, the client system may save a certain number of frames preceding the pressing of the shutter button and/or a certain number of frames after the pressing of the shutter button. The video is then associated with the picture image captured. Moreover, the associated video comprises a plurality of video frames. Each video frame may comprise one or more areas similar to the captured picture image.

In certain embodiments, a flash emits during the capturing of the video and/or frame. The camera may associate certain frames in the video and/or the captured frame when the shutter button was pressed as a frame that contains flash.

Moreover, in certain modes, different types of flash (e.g., adjusting color of a LED flash) may emit during different times of the capture mode. The camera may associate certain frames captured with the type of flash emitted. In addition, cameras may capture frames at different exposures (e.g., high dynamic range). In these embodiments, client system 130 may associate certain frames with the exposure level also. In addition, certain client systems comprise multiple camera lenses. Similar to the previous techniques, the client system may associate the captured frame with the camera lens.

In addition, each captured frame may comprise one or more areas. An area may be a portion of the captured frame. For example, an area may comprise a pixel of the captured frame. Generally, each captured frame contains one or more areas that correspond to the one or more areas in the other captured frame. For example, each captured frame may comprise a top-left pixel. Moreover, each area may be associated with certain characteristics, such as hue, tint, shade, tone, saturation, chromatic signal, luminosity, contract, brightness, and color. Brightness, for example, may be the relative lightness of the picture. For example, pure white has maximum brightness and pure black has minimum brightness. Brightness may be associated with the luminance for a specific area. Color, in addition, may be associated with three or four component intensities. For example, color may be associated with the amount of red, green, and blue, or, similarly, color may be associated with cyan, magenta, yellow, and black. The color may be represented by one or more digital color value associated with the area.

As an example, a captured frame may comprise of a pixel area of 4,288×2,848 pixels. Each pixel may be associated with a digital numeric color data. In certain embodiments, the luminance of the pixel may be calculated from the digital numeric color data. In alternate embodiments, each pixel may also be associated with a luminance of the pixel.

The computer machine may review the picture image and the associated video with the associated video comprising a plurality of video frames. In certain embodiments, computer machine may review the picture image and an associated video to detect the picture image and associated video. Moreover, computer machine may review the picture image and the associated video to determine that a composite image may be created from the picture image and associated video. In certain embodiments, a minimum number of video frames for the associated video must exist to create the composite image. In addition, the client system may communicate the picture image and the associated video to a social networking system and/or a third-party system. In alternative embodiments, the social networking system and/or the third-party system may access the client system to detect that a picture image and an associated video exists.

The computer machine may alter the picture image and/or associated video. Computer machine, for instance, may stabilize each video frame in the associated video. This may reduce blurring associated with the motion of the camera during the video capture. In certain embodiments, computer machine may compensate for pan and tilt of the camera during the video capture. In certain embodiments, computer machine may apply digital image stabilization to the video frames in the associated video. Stabilization of frames can be completed in various ways, including comparing the boundaries of each frame to identify and correct jitter and trimming the video frame to obtain portions of the video that appear in all frames. Computer machine may also use the pixels outside the border of the visible frame to provide a buffer for the motion. In alternate embodiments, the server may analyze the accelerometer and gyroscope from the image capture to determine how to stabilize the frames. Moreover, the server may also create intermediary frames by using frame blending. Frame blending creates interpolated frames between two video frames to smooth out the motion of the subject(s). The interpolated frames can be created by determining an optical flow (e.g., pattern of motion of objects) of the subject(s) in the picture. Moreover, computer machine may create an intermediary frame based on the detected motion of an object in the associated video.

Computer machine may statistically analyze corresponding areas for each video frame. In certain embodiments, computer machine may average the color and/or brightness for the corresponding area. For example, if the corresponding areas were the top-leftmost pixel, computer machine may average the digital color value associated with each top-leftmost pixel for each video frame. Computer machine may perform any type of statistical analysis on any type of characteristic associated with the area. For instance, computer machine may find the mean, median, mode, maximum, and/or minimum of the characteristic associated with the corresponding areas of each video frame. Moreover, computer machine may perform statistical analysis on a subset of video frames.

Computer machine may create a video frame image based in part on the statistical analysis of the corresponding areas for each video frame. The video frame image may be a composite of the results of the statistical analysis performed by computer machine. For example, after determining the average digital color value of the top-leftmost pixel for the video frame, the video frame image may comprise the average digital color value for its top-leftmost pixel for the video frame.

Computer machine may compare an area in the captured picture image with an associated area in the created video frame image. Computer machine may then create a composite image based in part on the comparison of the area in the picture image with the associated area in the video frame image. In certain embodiments, computer machine may compare an area in the captured picture image with an associated area in the created video frame image to determine which area has the higher brightness. In this embodiment, computer machine creating an area for a composite image based in part on the comparison of the area in the picture image with the associated area in the video frame image further comprises creating an area for a composite image based in part on the determined area with the higher brightness. As an example, in certain embodiments, computer machine may select a digital color value of a pixel for the composite image by selecting the digital color value associated with the higher brightness for corresponding pixels in the captured picture image and the video frame image. Moreover, computer machine may compare an area in the captured picture image with an associated area in the created video frame image in various ways. For example, computer machine may compare associated areas by statistically analyzing the two areas to determine a result of the statistical analysis. In certain embodiments, computer machine may directly compare the area in the captured picture image with the results of the statistical analysis for the associated area of each video frame.

Upon creating the composite image, computer machine may provide a visual display to the client system, wherein the visual display comprises a visual representation of the composite image and an action request comprising uploading content to the social networking system. For example, computer machine may display a graphic icon of the composite image or a representation of the composite image on the client system. Moreover, computer machine may display prompt, such as an action request, requesting the user to post the composite image. If there are more composite images to display at one time, a user may view the additional composite images by scrolling through the photos by a swiping motion or curser, or by selecting an icon (e.g., a left arrow or a right arrow) indicating one or more composite images are available. In certain embodiments, computer machine may display the picture image, the video associated with the picture image, and/or the video frame image alongside the composite image.

In addition, computer machine may identify an object in the picture by comparing a brightness of an area in the picture image with a brightness of an area in the video frame image. Computer machine may identify one or more objects in the picture, for example, by analyzing the differences between the image with flash lighting and the images without flash lighting. A user may select object(s) to brighten or not brighten in the image. In addition, the server may select a portion of the video frame to perform statistical analysis. For example, if the picture image correlates with a flash in the picture, computer machine may identify a background in the picture by correlating a dark flash-background with the dark background of the non-flash video frame image. As another example, if the picture image correlates with a flash in the picture, computer machine may identify an object in the picture by correlating an object with a high brightness in the picture image with an object with a high brightness in the non-flash video frame image. Alternatively, computer machine may identify one or more objects in the picture, for example, by applying facial recognition. Once one or more objects have been identified, a user may select the one or more objects. A user may communicate the selection to computer machine by selecting the object in the picture image through client system 130. Computer machine may perform a myriad of different actions to the one or more selected objects. For example, computer machine may create a composite image only for the identified object(s) in the picture or the non-identified object(s) in the picture.

FIG. 1 illustrates an example network environment 100 associated with a social-networking system. Network environment 100 includes a user 101, a client system 130, a social-networking system 160, and a third-party system 170 connected to each other by a network 110. Although FIG. 1 illustrates a particular arrangement of user 101, client system 130, social-networking system 160, third-party system 170, and network 110, this disclosure contemplates any suitable arrangement of user 101, client system 130, social-networking system 160, third-party system 170, and network 110. As an example and not by way of limitation, two or more of client system 130, social-networking system 160, and third-party system 170 may be connected to each other directly, bypassing network 110. As another example, two or more of client system 130, social-networking system 160, and third-party system 170 may be physically or logically co-located with each other in whole or in part. Moreover, although FIG. 1 illustrates a particular number of users 101, client systems 130, social-networking systems 160, third-party systems 170, and networks 110, this disclosure contemplates any suitable number of users 101, client systems 130, social-networking systems 160, third-party systems 170, and networks 110. As an example and not by way of limitation, network environment 100 may include multiple users 101, client system 130, social-networking systems 160, third-party systems 170, and networks 110.

In particular embodiments, user 101 may be an individual (human user), an entity (e.g., an enterprise, business, or third-party application), or a group (e.g., of individuals or entities) that interacts or communicates with or over social-networking system 160. In particular embodiments, social-networking system 160 may be a network-addressable computing system hosting an online social network. Social-networking system 160 may generate, store, receive, and send social-networking data, such as, for example, user-profile data, concept-profile data, social-graph information, or other suitable data related to the online social network. Social-networking system 160 may be accessed by the other components of network environment 100 either directly or via network 110. In particular embodiments, social-networking system 160 may include an authorization server (or other suitable component(s)) that allows users 101 to opt in to or opt out of having their actions logged by social-networking system 160 or shared with other systems (e.g., third-party systems 170), for example, by setting appropriate privacy settings. A privacy setting of a user may determine what information associated with the user may be logged, how information associated with the user may be logged, when information associated with the user may be logged, who may log information associated with the user, whom information associated with the user may be shared with, and for what purposes information associated with the user may be logged or shared. Authorization servers may be used to enforce one or more privacy settings of the users of social-networking system 30 through blocking, data hashing, anonymization, or other suitable techniques as appropriate. In particular embodiments, third-party system 170 may be a network-addressable computing system that can host a composite image. Third-party system 170 may generate, store, receive, and send one or more composite images. Third-party system 170 may be accessed by the other components of network environment 100 either directly or via network 110. In particular embodiments, one or more users 101 may use one or more client systems 130 to access, send data to, and receive data from social-networking system 160 or third-party system 170. Client system 130 may access social-networking system 160 or third-party system 170 directly, via network 110, or via a third-party system. As an example and not by way of limitation, client system 130 may access third-party system 170 via social-networking system 160. Client system 130 may be any suitable computing device, such as, for example, a personal computer, a laptop computer, a cellular telephone, a smartphone, a tablet computer, or an augmented/virtual reality device.

This disclosure contemplates any suitable network 110. As an example and not by way of limitation, one or more portions of network 110 may include an ad hoc network, an intranet, an extranet, a virtual private network (VPN), a local area network (LAN), a wireless LAN (WLAN), a wide area network (WAN), a wireless WAN (WWAN), a metropolitan area network (MAN), a portion of the Internet, a portion of the Public Switched Telephone Network (PSTN), a cellular telephone network, or a combination of two or more of these. Network 110 may include one or more networks 110.

Links 150 may connect client system 130, social-networking system 160, and third-party system 170 to communication network 110 or to each other. This disclosure contemplates any suitable links 150. In particular embodiments, one or more links 150 include one or more wireline (such as for example Digital Subscriber Line (DSL) or Data Over Cable Service Interface Specification (DOC SIS)), wireless (such as for example Wi-Fi or Worldwide Interoperability for Microwave Access (WiMAX)), or optical (such as for example Synchronous Optical Network (SONET) or Synchronous Digital Hierarchy (SDH)) links. In particular embodiments, one or more links 150 each include an ad hoc network, an intranet, an extranet, a VPN, a LAN, a WLAN, a WAN, a WWAN, a MAN, a portion of the Internet, a portion of the PSTN, a cellular technology-based network, a satellite communications technology-based network, another link 150, or a combination of two or more such links 150. Links 150 need not necessarily be the same throughout network environment 100. One or more first links 150 may differ in one or more respects from one or more second links 150.

Moreover, a computer machine may comprise either client system 130, social networking system 160, or third-party system 170. In certain embodiments, a computer machine may comprise one or more client systems 130, social networking systems 160, and third-party system 170. Moreover, a computer machine may comprise all three of one or more client systems 140, social networking systems 160, and third-party systems 170 or may comprise a subset of the one or more client systems 140, social networking systems 160, and third-party systems 170.

FIGS. 2A-2D are a set of example pictorials depicting the long exposure filter. While the illustration shows each image comprising 16 areas, the disclosure contemplates any number of areas for each image. In certain embodiments, each area may comprise a pixel.

Figure 2A:
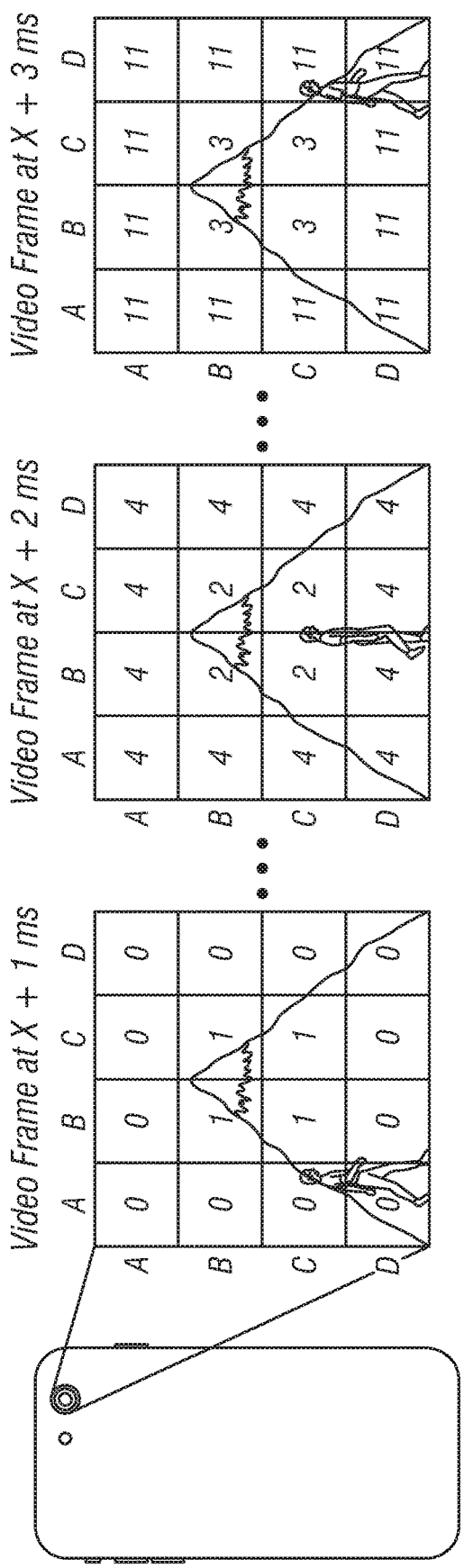
FIGS. 2A-2D are a set of example pictorials depicting the long exposure filter.

FIG. 2A is a set of example pictures resembling video frame images of a video. Each box in the image is associated with an area of the video frame image. Moreover, each number in each area represents a brightness for the area. For example, Row A, Column A in video frame at x+1 ms indicates a brightness of 0 for that area. Similarly, Row A, Column A in video frame at x+2 ms indicates a brightness of 4 for that area, and Row A, Column A in video frame at x+3 ms indicates a brightness of 6 for that area.

Figures 2B, 2C, 2D:
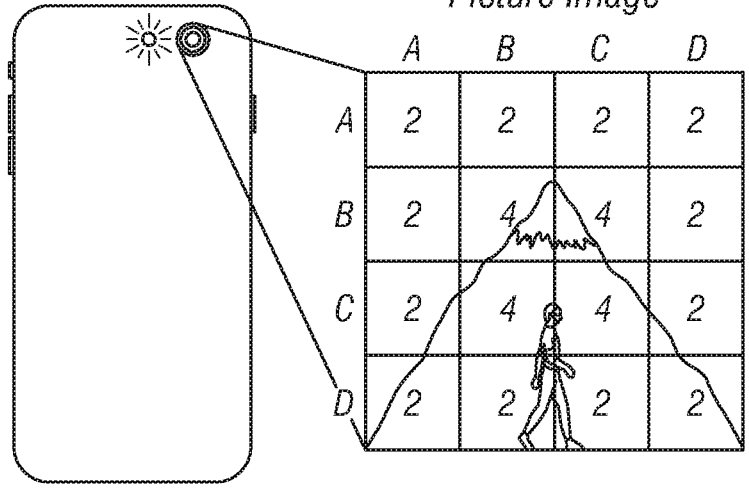

FIG. 2B illustrates an example picture resembling a video frame image. The video frame image may be based in part on the statistical analysis of the corresponding areas for each video frame. In the illustrated example, the video frame image is an average of brightness indicated for the corresponding areas for video frame at x+1 ms, video frame at x+2 ms, and video frame at x+3 ms. For example, Row A, Column A of the video frame image is an average of the brightness of 0 for video frame at x+1 ms (indicated in Row A, Column A of video frame at x+1 ms in FIG. 2A), 4 for video frame at x+2 ms (indicated in Row A, Column A of video frame at x+2 ms in FIG. 2A), and 11 for video frame at x+3 ms (indicated in Row A, Column A of video frame at x+3 ms in FIG. 2A). As can be seen in Row A, Column A of the video frame image, the average of these three brightness indicators is 5.

The computer machine may perform a statistical analysis on a multitude of characteristics of each video frame. For example, the computer machine may perform a statistical analysis on the associated color for each corresponding area and then create the video frame image based in part on the statistical analysis result.

Also, as illustrated, a person is walking from the left portion of the vide frame to the right portion of the video frame as time increases in the video frame images. Performing statistical analysis on the characteristic of the photo (e.g., brightness in this example) may introduce the effect of motion blur. Motion blur is the apparent streaking of moving objects and may create the effect of capturing a motion in a still image. In the illustrated example, the motion blur is represented by the lines trailing the person illustrating the apparent streaking of the moving person. A user may increase the effects of motion blur by adjusting the type of statistical analysis performed on the video frame or may introduce motion blur separately from the statistical analysis.

FIG. 2C illustrates an example picture image. In the illustrated embodiment, the picture image is an image captured by client system 130 when a flash occurred. Similar to the video frame image, each box in the image is associated with an area of the picture image. Moreover, each number in each area represents a brightness for the area. For example, Row A, Column A in picture image indicates a brightness of 2 for that area.

FIG. 2D illustrates an example composite image. The composite image may be based in part on a comparison of an area in the captured picture image (e.g., FIG. 2C) with an associated area in the created video frame image (e.g., FIG. 2B). In the illustrated embodiment, computer machine may compare an area in the captured picture image with an associated area in the created video frame image to determine which area has the higher brightness. Moreover, in this embodiment, computer machine may create an area for a composite image based in part on the comparison of the area in the picture image with the associated area in the video frame image. In particular, computer machine may create the area for the composite image based in part on the determined area with the higher brightness.

For example, computer machine may compare the brightness of Row A, Column A of the captured picture image in FIG. 2C (i.e., brightness of 2) with the brightness of Row A, Column A of the video frame image in FIG. 2B (i.e., brightness of 5). Based on this comparison, computer machine may determine that video frame image has the higher brightness for that area. Accordingly, computer machine may create the area covering Row A, Column A for the composite picture in FIG. 2D based in part on the corresponding area in the video frame image because computer machine determined that the video frame image had the higher brightness.

Also, as illustrated, the long frame picture filter may introduce the effect of motion blur. In the illustrated example, the motion blur is represented by the lines trailing the person illustrating the apparent streaking of the moving person. A user may increase the effects of motion blur by adjusting the type of statistical analysis performed on the video frame or may introduce motion blur separately from the statistical analysis. In addition, the filter may also develop a clearer image by reducing the noise of the picture.

FIG. 3A-3D are a second set of example pictorials depicting the long exposure filter.

Figure 3A:
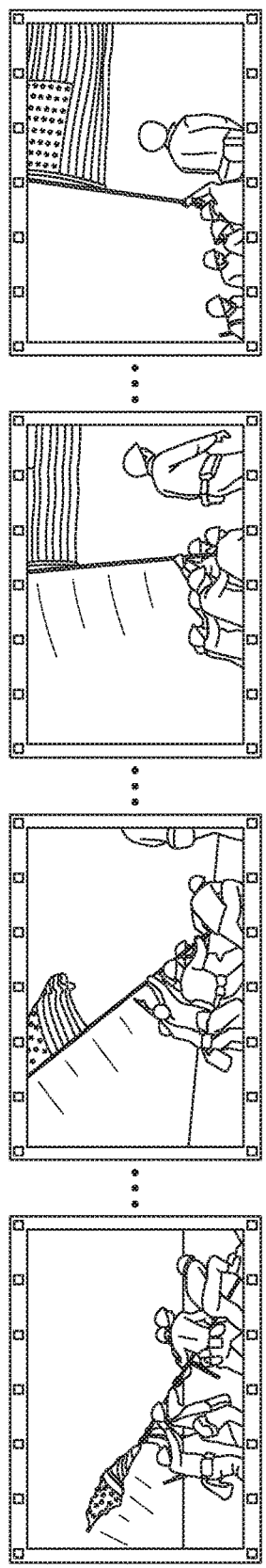
FIGS. 3A-3D are a second set of example pictorials depicting the long exposure filter.

FIG. 3A is a set of example pictures resembling video frame images of the iconic video of American soldiers raising the flag in Iwo Jima. As depicted in each video frame, the soldiers raise the American flag across each video frame image. FIG. 3A is noticeably darker, indicating that the video frame images were captured during non-flash periods.

Figure 3B:
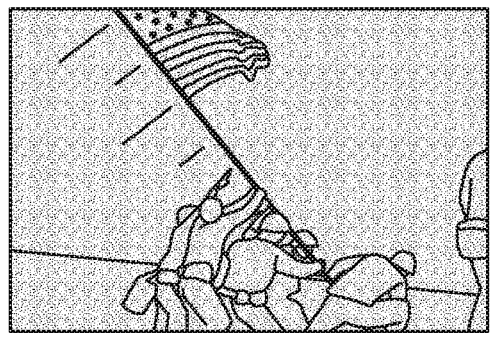

FIG. 3B illustrates an example picture resembling a video frame image. The video frame image may be based in part on the statistical analysis of the corresponding areas for each video frame. In the illustrated example, the video frame image is an average of the video frame image in the set of example video frame images. FIG. 3B is also noticeably darker, indicating that the video frame image is a composite of video frame images that do not have flash (as compared to the picture image in FIG. 3C). Also, as illustrated in FIG. 3B, the flag contains a motion blur represented by the lines trailing the motion of the flag.

Figure 3C:
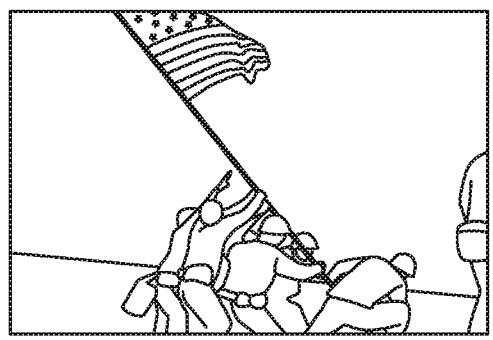

FIG. 3C illustrates an example picture image. In the illustrated embodiment, the picture image is an image captured by client system 130 when a flash occurred. Because the flash occurred while capturing the picture image, FIG. 3C is noticeably lighter than the video frame image depicted in FIG. 3B.

Figure 3D:
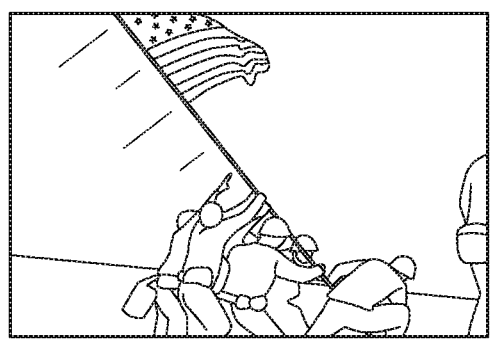

FIG. 3D illustrates an example composite image. The composite image may be based in part on a comparison of an area in the captured picture image (e.g., FIG. 3C) with an associated area in the created video frame image (e.g., FIG. 3B). In the illustrated embodiment, computer machine may compare with an associated area in the created video frame image to determine which area has the higher brightness. Accordingly, FIG. 3D is noticeably lighter than FIG. 3B. In addition, in this embodiment, computer machine may create an area for a composite image based in part on the comparison of the area in the picture image with the associated area in the video frame image. In particular, computer machine may create the area for the composite image based in part on the determined area with the higher brightness. Accordingly, FIG. 3D is able to capture the motion blur associated with the video frame image depicted in FIG. 3B.

Figure 4:
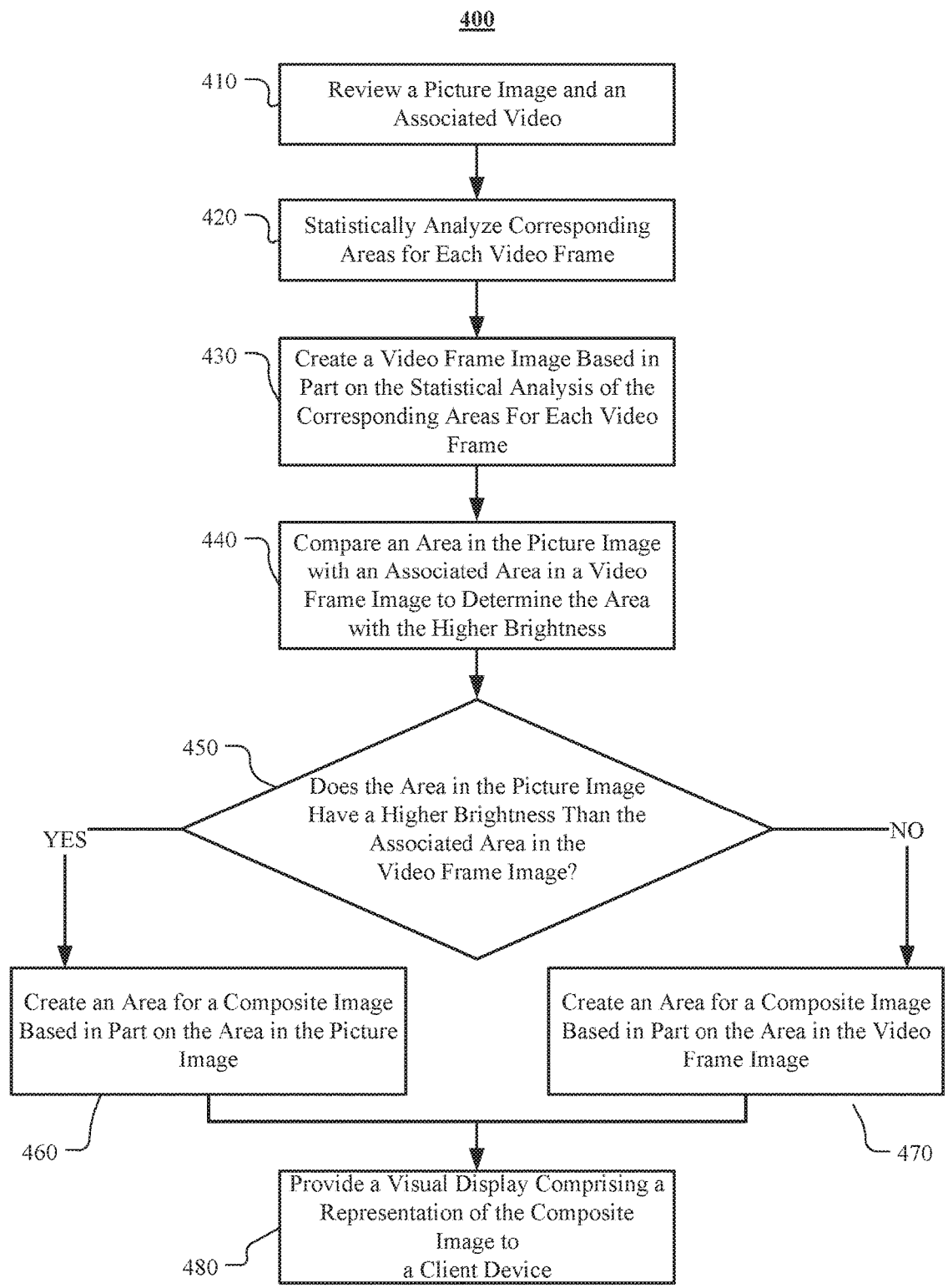
FIG. 4 illustrates an example method for a long exposure filter.

FIG. 4 illustrates an example method 400 for a long exposure filter. The method may begin at step 410, where a computer machine may review the picture image and the associated video with the associated video comprising a plurality of video frames. In certain embodiments, computer machine may review the picture image and an associated video to detect the picture image and associated video. In addition, client system 130 may communicate the picture image and the associated video to social networking system 160 and/or third-party system 170. In alternative embodiments, social networking system 160 and/or third-party system 170 may access client system 130 to detect that a picture image and an associated video exists.

At step 420, computer server machine statistically analyzes the corresponding areas for each video frame. In certain embodiments, computer machine may average the color and/or brightness for the corresponding area. Moreover, computer machine may perform statistical analysis on only a subset of video frames.

At step 430, computer machine may create a video frame image based in part on the statistical analysis of the corresponding areas for each video frame. The video frame image may be a composite of the results of the statistical analysis performed by computer machine.

At step 440, computer machine may compare an area in the captured picture image with an associated area in the created video frame image. At step 450, computer machine determines whether the area in the picture image has a higher brightness than the associated area in the video frame image. If the area in the picture image has a higher brightness than the associated area in the video frame image, the method proceeds to step 460. If the area in the picture image does not have a higher brightness than the associated area in the video frame image, the method proceeds to step 470.

At step 460, computer machine may create an area of a composite image based in part on the area in the picture image. Alternatively, at step 470, computer machine may create an area of a composite image based in part on the area in the video frame image.

At step 480, computer machine may provide a visual display to client system 130, wherein the visual display comprises a visual representation of the composite image and an action request comprising uploading content to the social networking system. For example, computer machine may display a graphic icon of the composite image or a representation of the composite image on client system 130. Moreover, computer machine may display prompt, such as an action request, requesting the user to post the composite image on social networking system 160.

Particular embodiments may repeat one or more steps of the method of FIG. 4, where appropriate. Although this disclosure describes and illustrates particular steps of the method of FIG. 4 as occurring in a particular order, this disclosure contemplates any suitable steps of the method of FIG. 4 occurring in any suitable order. Moreover, although this disclosure describes and illustrates an example method for a long exposure filter including the particular steps of the method of FIG. 4, this disclosure contemplates any suitable method for a long exposure filter including any suitable steps, which may include all, some, or none of the steps of the method of FIG. 4, where appropriate. Furthermore, although this disclosure describes and illustrates particular components, devices, or systems carrying out particular steps of the method of FIG. 4, this disclosure contemplates any suitable combination of any suitable components, devices, or systems carrying out any suitable steps of the method of FIG. 4.

Figure 5:
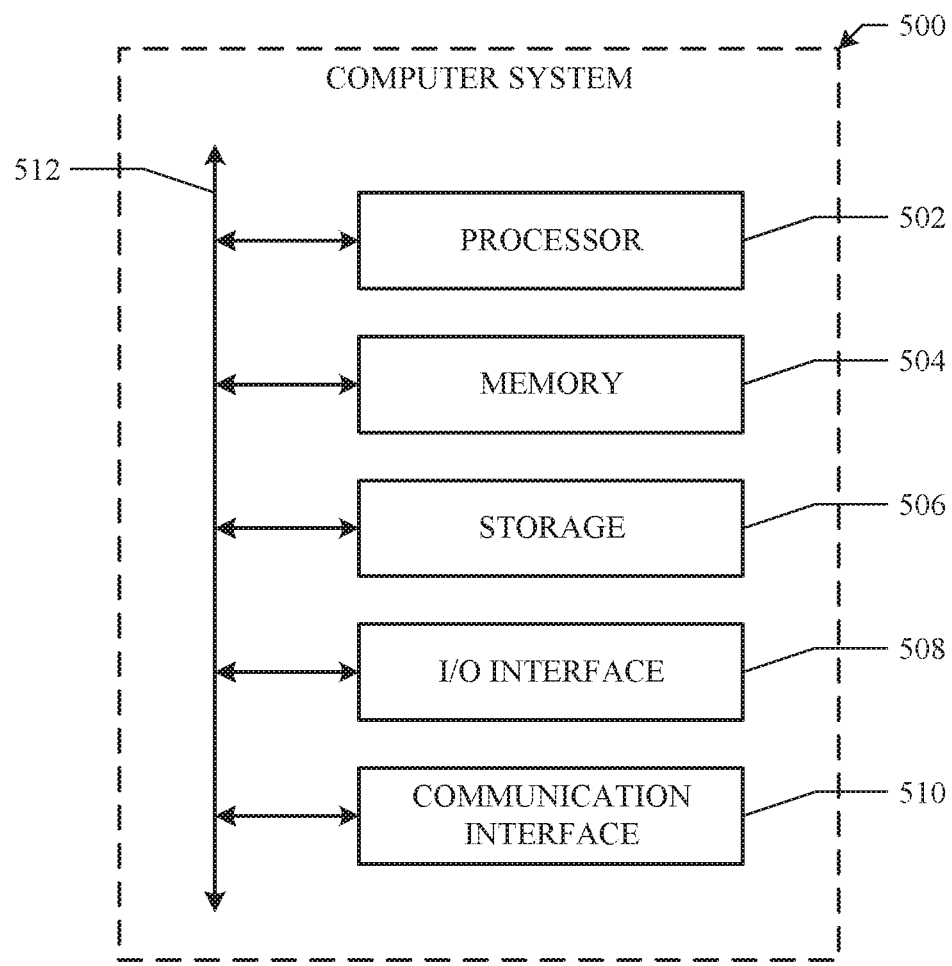
FIG. 5 illustrates an example computer system.

FIG. 5 illustrates an example computer system 500. In particular embodiments, one or more computer systems 500 perform one or more steps of one or more methods described or illustrated herein. In particular embodiments, one or more computer systems 500 provide functionality described or illustrated herein. In particular embodiments, software running on one or more computer systems 500 performs one or more steps of one or more methods described or illustrated herein or provides functionality described or illustrated herein. Particular embodiments include one or more portions of one or more computer systems 500. Herein, reference to a computer system may encompass a computing device, and vice versa, where appropriate. Moreover, reference to a computer system may encompass one or more computer systems, where appropriate.

This disclosure contemplates any suitable number of computer systems 500. This disclosure contemplates computer system 500 taking any suitable physical form. As example and not by way of limitation, computer system 500 may be an embedded computer system, a system-on-chip (SOC), a single-board computer system (SBC) (such as, for example, a computer-on-module (COM) or system-on-module (SOM)), a desktop computer system, a laptop or notebook computer system, an interactive kiosk, a mainframe, a mesh of computer systems, a mobile telephone, a personal digital assistant (PDA), a server, a tablet computer system, an augmented/virtual reality device, or a combination of two or more of these. Where appropriate, computer system 500 may include one or more computer systems 500; be unitary or distributed; span multiple locations; span multiple machines; span multiple data centers; or reside in a cloud, which may include one or more cloud components in one or more networks. Where appropriate, one or more computer systems 500 may perform without substantial spatial or temporal limitation one or more steps of one or more methods described or illustrated herein. As an example and not by way of limitation, one or more computer systems 500 may perform in real time or in batch mode one or more steps of one or more methods described or illustrated herein. One or more computer systems 500 may perform at different times or at different locations one or more steps of one or more methods described or illustrated herein, where appropriate.

In particular embodiments, computer system 500 includes a processor 502, memory 504, storage 506, an input/output (I/O) interface 508, a communication interface 510, and a bus 512. Although this disclosure describes and illustrates a particular computer system having a particular number of particular components in a particular arrangement, this disclosure contemplates any suitable computer system having any suitable number of any suitable components in any suitable arrangement.

In particular embodiments, processor 502 includes hardware for executing instructions, such as those making up a computer program. As an example and not by way of limitation, to execute instructions, processor 502 may retrieve (or fetch) the instructions from an internal register, an internal cache, memory 504, or storage 506; decode and execute them; and then write one or more results to an internal register, an internal cache, memory 504, or storage 506. In particular embodiments, processor 502 may include one or more internal caches for data, instructions, or addresses. This disclosure contemplates processor 502 including any suitable number of any suitable internal caches, where appropriate. As an example and not by way of limitation, processor 502 may include one or more instruction caches, one or more data caches, and one or more translation lookaside buffers (TLBs). Instructions in the instruction caches may be copies of instructions in memory 504 or storage 506, and the instruction caches may speed up retrieval of those instructions by processor 502. Data in the data caches may be copies of data in memory 504 or storage 506 for instructions executing at processor 502 to operate on; the results of previous instructions executed at processor 502 for access by subsequent instructions executing at processor 502 or for writing to memory 504 or storage 506; or other suitable data. The data caches may speed up read or write operations by processor 502. The TLBs may speed up virtual-address translation for processor 502. In particular embodiments, processor 502 may include one or more internal registers for data, instructions, or addresses. This disclosure contemplates processor 502 including any suitable number of any suitable internal registers, where appropriate. Where appropriate, processor 502 may include one or more arithmetic logic units (ALUs); be a multi-core processor; or include one or more processors 502. Although this disclosure describes and illustrates a particular processor, this disclosure contemplates any suitable processor.

In particular embodiments, memory 504 includes main memory for storing instructions for processor 502 to execute or data for processor 502 to operate on. As an example and not by way of limitation, computer system 500 may load instructions from storage 506 or another source (such as, for example, another computer system 500) to memory 504. Processor 502 may then load the instructions from memory 504 to an internal register or internal cache. To execute the instructions, processor 502 may retrieve the instructions from the internal register or internal cache and decode them. During or after execution of the instructions, processor 502 may write one or more results (which may be intermediate or final results) to the internal register or internal cache. Processor 502 may then write one or more of those results to memory 504. In particular embodiments, processor 502 executes only instructions in one or more internal registers or internal caches or in memory 504 (as opposed to storage 506 or elsewhere) and operates only on data in one or more internal registers or internal caches or in memory 504 (as opposed to storage 506 or elsewhere). One or more memory buses (which may each include an address bus and a data bus) may couple processor 502 to memory 504. Bus 512 may include one or more memory buses, as described below. In particular embodiments, one or more memory management units (MMUs) reside between processor 502 and memory 504 and facilitate accesses to memory 504 requested by processor 502. In particular embodiments, memory 504 includes random access memory (RAM). This RAM may be volatile memory, where appropriate Where appropriate, this RAM may be dynamic RAM (DRAM) or static RAM (SRAM). Moreover, where appropriate, this RAM may be single-ported or multi-ported RAM. This disclosure contemplates any suitable RAM. Memory 504 may include one or more memories 504, where appropriate. Although this disclosure describes and illustrates particular memory, this disclosure contemplates any suitable memory.

In particular embodiments, storage 506 includes mass storage for data or instructions. As an example and not by way of limitation, storage 506 may include a hard disk drive (HDD), a floppy disk drive, flash memory, an optical disc, a magneto-optical disc, magnetic tape, or a Universal Serial Bus (USB) drive or a combination of two or more of these. Storage 506 may include removable or non-removable (or fixed) media, where appropriate. Storage 506 may be internal or external to computer system 500, where appropriate. In particular embodiments, storage 506 is non-volatile, solid-state memory. In particular embodiments, storage 506 includes read-only memory (ROM). Where appropriate, this ROM may be mask-programmed ROM, programmable ROM (PROM), erasable PROM (EPROM), electrically erasable PROM (EEPROM), electrically alterable ROM (EAROM), or flash memory or a combination of two or more of these. This disclosure contemplates mass storage 506 taking any suitable physical form. Storage 506 may include one or more storage control units facilitating communication between processor 502 and storage 506, where appropriate. Where appropriate, storage 506 may include one or more storages 506. Although this disclosure describes and illustrates particular storage, this disclosure contemplates any suitable storage.

In particular embodiments, I/O interface 508 includes hardware, software, or both, providing one or more interfaces for communication between computer system 500 and one or more I/O devices. Computer system 500 may include one or more of these I/O devices, where appropriate. One or more of these I/O devices may enable communication between a person and computer system 500. As an example and not by way of limitation, an I/O device may include a keyboard, keypad, microphone, monitor, mouse, printer, scanner, speaker, still camera, stylus, tablet, touch screen, trackball, video camera, another suitable I/O device or a combination of two or more of these. An I/O device may include one or more sensors. This disclosure contemplates any suitable I/O devices and any suitable I/O interfaces 508 for them. Where appropriate, I/O interface 508 may include one or more device or software drivers enabling processor 502 to drive one or more of these I/O devices. I/O interface 508 may include one or more I/O interfaces 508, where appropriate. Although this disclosure describes and illustrates a particular I/O interface, this disclosure contemplates any suitable I/O interface.

In particular embodiments, communication interface 510 includes hardware, software, or both providing one or more interfaces for communication (such as, for example, packet-based communication) between computer system 500 and one or more other computer systems 500 or one or more networks. As an example and not by way of limitation, communication interface 510 may include a network interface controller (NIC) or network adapter for communicating with an Ethernet or other wire-based network or a wireless NIC (WNIC) or wireless adapter for communicating with a wireless network, such as a WI-FI network. This disclosure contemplates any suitable network and any suitable communication interface 510 for it. As an example and not by way of limitation, computer system 500 may communicate with an ad hoc network, a personal area network (PAN), a local area network (LAN), a wide area network (WAN), a metropolitan area network (MAN), or one or more portions of the Internet or a combination of two or more of these. One or more portions of one or more of these networks may be wired or wireless. As an example, computer system 500 may communicate with a wireless PAN (WPAN) (such as, for example, a BLUETOOTH WPAN), a WI-FI network, a WI-MAX network, a cellular telephone network (such as, for example, a Global System for Mobile Communications (GSM) network), or other suitable wireless network or a combination of two or more of these. Computer system 500 may include any suitable communication interface 510 for any of these networks, where appropriate. Communication interface 510 may include one or more communication interfaces 510, where appropriate. Although this disclosure describes and illustrates a particular communication interface, this disclosure contemplates any suitable communication interface.

In particular embodiments, bus 512 includes hardware, software, or both coupling components of computer system 500 to each other. As an example and not by way of limitation, bus 512 may include an Accelerated Graphics Port (AGP) or other graphics bus, an Enhanced Industry Standard Architecture (EISA) bus, a front-side bus (FSB), a HYPERTRANSPORT (HT) interconnect, an Industry Standard Architecture (ISA) bus, an INFINIBAND interconnect, a low-pin-count (LPC) bus, a memory bus, a Micro Channel Architecture (MCA) bus, a Peripheral Component Interconnect (PCI) bus, a PCI-Express (PCIe) bus, a serial advanced technology attachment (SATA) bus, a Video Electronics Standards Association local (VLB) bus, or another suitable bus or a combination of two or more of these. Bus 512 may include one or more buses 512, where appropriate. Although this disclosure describes and illustrates a particular bus, this disclosure contemplates any suitable bus or interconnect.

Herein, a computer-readable non-transitory storage medium or media may include one or more semiconductor-based or other integrated circuits (ICs) (such, as for example, field-programmable gate arrays (FPGAs) or application-specific ICs (ASICs)), hard disk drives (HDDs), hybrid hard drives (HHDs), optical discs, optical disc drives (ODDs), magneto-optical discs, magneto-optical drives, floppy diskettes, floppy disk drives (FDDs), magnetic tapes, solid-state drives (SSDs), RAM-drives, SECURE DIGITAL cards or drives, any other suitable computer-readable non-transitory storage media, or any suitable combination of two or more of these, where appropriate. A computer-readable non-transitory storage medium may be volatile, non-volatile, or a combination of volatile and non-volatile, where appropriate.

Herein, "or" is inclusive and not exclusive, unless expressly indicated otherwise or indicated otherwise by context. Therefore, herein, "A or B" means "A, B, or both," unless expressly indicated otherwise or indicated otherwise by context. Moreover, "and" is both joint and several, unless expressly indicated otherwise or indicated otherwise by context. Therefore, herein, "A and B" means "A and B, jointly or severally," unless expressly indicated otherwise or indicated otherwise by context.

The scope of this disclosure encompasses all changes, substitutions, variations, alterations, and modifications to the example embodiments described or illustrated herein that a person having ordinary skill in the art would comprehend. The scope of this disclosure is not limited to the example embodiments described or illustrated herein. Moreover, although this disclosure describes and illustrates respective embodiments herein as including particular components, elements, feature, functions, operations, or steps, any of these embodiments may include any combination or permutation of any of the components, elements, features, functions, operations, or steps described or illustrated anywhere herein that a person having ordinary skill in the art would comprehend. Furthermore, reference in the appended claims to an apparatus or system or a component of an apparatus or system being adapted to, arranged to, capable of, configured to, enabled to, operable to, or operative to perform a particular function encompasses that apparatus, system, component, whether or not it or that particular function is activated, turned on, or unlocked, as long as that apparatus, system, or component is so adapted, arranged, capable, configured, enabled, operable, or operative. Additionally, although this disclosure describes or illustrates particular embodiments as providing particular advantages, particular embodiments may provide none, some, or all of these advantages.

What is claimed is:

1. A method comprising:
   by a computer machine, reviewing a picture image and an associated video, wherein the associated video comprises a plurality of video frames;
   by the computer machine, statistically analyzing corresponding areas for each video frame;
   by the computer machine, detecting a motion of an object in the associated video;
   by the computer machine, creating an intermediary frame comprising a motion blur representing the detected motion of the object;
   by the computer machine, comparing an area in the picture image with an associated area in a video frame image, wherein the video frame image is based in part on the intermediary frame and the statistical analysis of the corresponding areas for each video frame; and
   by the computer machine, creating a composite image based in part on the comparison of the area in the picture image with the associated area in the video frame image, wherein the creating comprises, for each pixel in the composite image, selecting a digital color value associated with a higher brightness from digital color values for corresponding pixels in the picture image and the video frame image.

2. The method of claim 1, wherein statistically analyzing the corresponding areas for each video frame further comprises averaging the color of the corresponding areas for each video frame.

3. The method of claim 1, further comprising:
   by the computer machine, identifying an object in the picture image by comparing a brightness of an area in the picture image with a brightness of an area in the video frame;
   by the computer machine, receiving a selection of the object in the picture image;
   and wherein the area in the picture image and the associated area in the video frame image is the identified object in the picture image.

4. The method of claim 1, further comprising stabilizing each video frame in the associated video.

5. The method of claim 1, further comprising:
   providing a visual display to a client device, wherein the visual display comprises a visual representation of the composite image and an action request comprising uploading content to a social networking system.

6. One or more computer-readable non-transitory storage media embodying software that is operable when executed to:
   review a picture image and an associated video, wherein the associated video comprises a plurality of video frames;
   statistically analyze corresponding areas for each video frame;
   detect a motion of an object in the associated video;
   create an intermediary frame comprising a motion blur representing the detected motion of the object;
   compare an area in the picture image with an associated area in a video frame image, wherein the video frame image is based in part on the intermediary frame and the statistical analysis of the corresponding areas for each video frame; and
   create a composite image based in part on the comparison of the area in the picture image with the associated area in the video frame image, wherein the creating comprises, for each pixel in the composite image, selecting a digital color value associated with a higher brightness from digital color values for corresponding pixels in the picture image and the video frame image.

7. The media of claim 6, wherein statistically analyzing the corresponding areas for each video frame further comprises averaging the color of the corresponding areas for each video frame.

8. The media of claim 6, wherein the software is further operable when executed to:
   identify an object in the picture image by comparing a brightness of an area in the picture image with a brightness of an area in the video frame;
   receive a selection of the object;
   and wherein the area in the picture image and the associated area in the video frame image is the identified object in the picture image.

9. The media of claim 6, wherein the software is further operable when executed to stabilize each video frame in the associated video.

10. The media of claim 6, wherein the software is further operable when executed to:
    provide a visual display to a client device, wherein the visual display comprises a visual representation of the composite image and an action request comprising uploading content to a social networking system.

11. A system comprising: one or more processors; and a memory coupled to the processors comprising instructions executable by the processors, the processors being operable when executing the instructions to:
    review a picture image and an associated video, wherein the associated video comprises a plurality of video frames;
    statistically analyze corresponding areas for each video frame;
    detect a motion of an object in the associated video;
    create an intermediary frame comprising a motion blur representing the detected motion of the object;
    compare an area in the picture image with an associated area in a video frame image, wherein the video frame image is based in part on the intermediary frame and the statistical analysis of the corresponding areas for each video frame; and
    create a composite image based in part on the comparison of the area in the picture image with the associated area in the video frame image, wherein the creating comprises, for each pixel in the composite image, selecting a digital color value associated with a higher brightness from digital color values for corresponding pixels in the picture image and the video frame image.

12. The system of claim 11, wherein statistically analyzing the corresponding areas for each video frame further comprises averaging the color of the corresponding areas for each video frame.

13. The system of claim 11, wherein the processors are further operable when executing the instructions to:
    identify an object in the picture image by comparing a brightness of an area in the picture image with a brightness of an area in the video frame;
    receive a selection of the object;
    and wherein the area in the picture image and the associated area in the video frame image is the identified object in the picture image.

* * * * *